United States Patent
Yost et al.

(10) Patent No.: US 9,528,863 B2
(45) Date of Patent: Dec. 27, 2016

(54) SENSOR DEVICES UTILIZING LOOK-UP TABLES FOR ERROR CORRECTION AND METHODS THEREOF

(75) Inventors: Paul W. Yost, Portsmouth, OH (US); Stephen P. Landers, Portsmouth, OH (US)

(73) Assignee: YOST LABS INC., Portsmouth, OH (US)

( * ) Notice: Subject to any disclaimer, the term of this patent is extended or adjusted under 35 U.S.C. 154(b) by 1172 days.

(21) Appl. No.: 13/478,757

(22) Filed: May 23, 2012

(65) Prior Publication Data

US 2012/0265470 A1    Oct. 18, 2012

Related U.S. Application Data

(63) Continuation of application No. PCT/US2012/033499, filed on Apr. 13, 2012.

(60) Provisional application No. 61/475,853, filed on Apr. 15, 2011.

(51) Int. Cl.
    *G01D 18/00* (2006.01)
(52) U.S. Cl.
    CPC .................. *G01D 18/008* (2013.01)
(58) Field of Classification Search
    CPC ...................................... G01D 18/008
    See application file for complete search history.

(56) References Cited

U.S. PATENT DOCUMENTS

| | | | |
|---|---|---|---|
| 6,810,738 B2 | 11/2004 | Sakaguchi | |
| 7,143,004 B2 | 11/2006 | Townsend et al. | |
| 7,433,798 B2 | 10/2008 | Townsend et al. | |
| 7,653,513 B2* | 1/2010 | Resende et al. | 702/189 |
| 7,979,231 B2 | 7/2011 | Eckert | |
| 8,010,308 B1 | 8/2011 | Churchill | |
| 8,498,827 B2 | 7/2013 | Yost | |
| 2003/0158694 A1* | 8/2003 | Wegerich | 702/127 |

(Continued)

FOREIGN PATENT DOCUMENTS

WO    2015021122    2/2015

OTHER PUBLICATIONS

PCT International Search Report and Written opinion of the International Searching Authority, PCT/US2012/033499, filed Apr. 13, 2012.

*Primary Examiner* — Janet Suglo
(74) *Attorney, Agent, or Firm* — Edell, Shapiro & Finnan, LLC (57) ABSTRACT

Sensor devices and methods for producing corrected sensor vectors are disclosed. According to one embodiment, a method of correcting a sensor vector provided by a sensor includes determining a largest magnitude vector component of a sensor vector having N dimensions, and determining a sign of the largest magnitude vector component. The method further includes selecting a major region of interest of a look-up table based on the largest magnitude vector component of the sensor vector and the sign of the largest magnitude vector component, wherein the look-up table includes 2*N major regions of interest, and each major region of interest has a plurality of cells. A cell that is nearest to the sensor vector is selected, and a final corrective data $c_v$ is applied to the sensor vector to obtain a corrected sensor vector, wherein the final corrective data $c_v$ is associated with the selected cell.

24 Claims, 8 Drawing Sheets

(56) References Cited

U.S. PATENT DOCUMENTS

| | | |
|---|---|---|
| 2004/0262396 A1 | 12/2004 | Longacre, Jr. et al. |
| 2005/0097447 A1* | 5/2005 | Serra et al. ............... 715/503 |
| 2008/0052010 A1* | 2/2008 | Lee et al. ................. 702/24 |
| 2010/0114517 A1 | 5/2010 | Boeve et al. |
| 2012/0130652 A1 | 5/2012 | Yost |
| 2013/0311129 A1 | 11/2013 | Yost |
| 2013/0338955 A1 | 12/2013 | Landers et al. |

* cited by examiner

SENSOR DEVICES UTILIZING LOOK-UP TABLES FOR ERROR CORRECTION AND METHODS THEREOF

CROSS REFERENCE TO RELATED APPLICATIONS

This application is a continuation of U.S. PCT patent application Ser. No. PCT/US12/33499 filed Apr. 13, 2012 and claims the benefit of U.S. Provisional Patent Application Ser. No. 61/475,853, filed Apr. 15, 2011, the entire disclosures of which are hereby incorporated herein by reference.

TECHNICAL FIELD

The present application relates to sensor devices and, more particularly, sensor devices and methods for error correction of sensor vectors.

SUMMARY

Many systems incorporate sensors to measure directional physical quantities. Such sensors may include, but are not limited to, multi-axis magnetometers, multi-axis accelerometers, sonar arrays, radar arrays, and the like. Because the position of the sensor relative to the physical quantity being measured determines the sensor output vector (i.e., the sensor vector), the sensor may be considered a positional vector-valued sensor. Thus, positional vector-valued sensors are a class of sensor which has a relationship between a relative sensor orientation and a source orientation that produce a vector output.

Figure 1A:
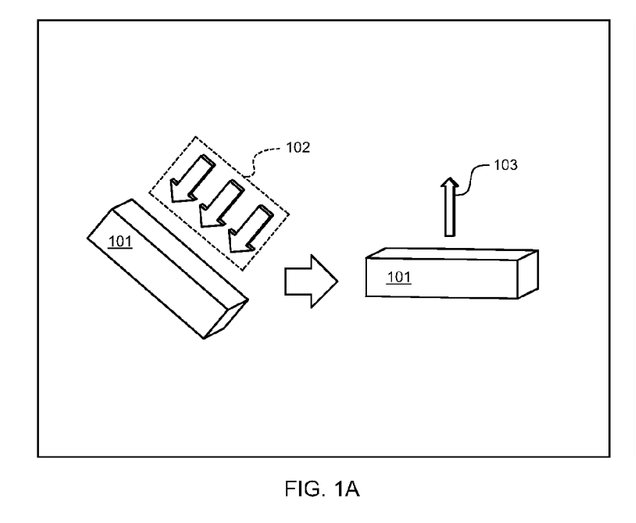
FIG. 1A schematically depicts a sensor device in a first orientation and producing a first sensor reading.
Figure 1B:
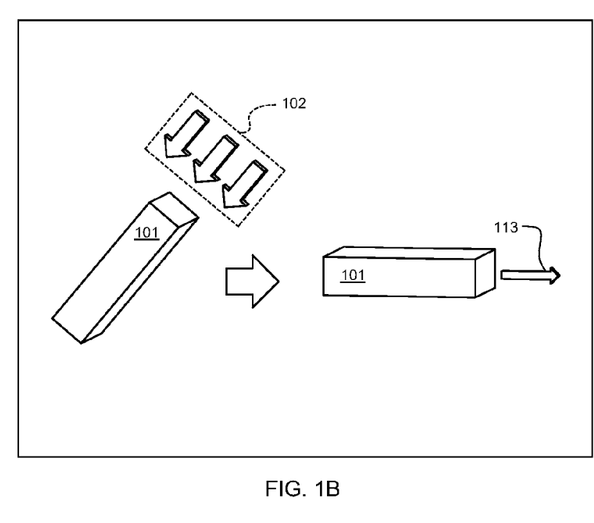
FIG. 1B schematically depicts a sensor device in a second orientation and producing a second sensor reading.

FIG. 1A illustrates a sensor device 101 in a particular orientation. The sensor device 101, senses a physical quantity 102. The physical quantity 102 may be magnetic North or acceleration due to gravity, for example. The sensor device 101 provides a sensor reading 103 that is relative to the body of the sensor device 101. Similarly, as shown in FIG. 1B, the sensor 101, when placed in a different orientation, senses the same physical quantity 102 and yields a second sensor reading 113.

However, sensors can exhibit inaccuracies stemming from a variety of sources. Sources of sensor inaccuracy may include internal sensor error sources, such as sensor scale and bias effects, non-linear sensor output, asymmetric sensor output, sensor non-orthogonality, and sensor cross-axis effect, or external error sources such as distortion or attenuation of the physical quantity being measured. For example, a multi-axis magnetometer may exhibit inaccuracies from imperfections in the sensor itself (scale/bias, sensor non-linearity, cross-axis effect, etc.), as well as from magnetic field distortion due to soft-iron effects of nearby ferrous system components or hard-iron effects of nearby magnetic sources such as motors, speakers, current carrying conductors, and the like.

Error in vector-valued sensors may be accounted for in a variety of ways. The design and placement of the sensor within the system may be carefully chosen to minimize or shield the sensor from external error sources. The internal sensor error sources may also be minimized by treating the system as a whole, and using computational transformations, such as scaling, translating, skewing, and rotating the sensor output vectors, to minimize error. These methods, however, can vary in effectiveness because removal of external disturbances is sometimes not feasible (e.g., a system may require a battery to be positioned near the magnetometer due to space constraints), and removal of internal sensor error in practice may be difficult because vector-valued sensors with non-linear, asymmetric, non-orthogonal response properties cannot be effectively corrected using simple transformations of the data as a whole.

Embodiments of the present disclosure improve accuracies of sensor devices by applying corrective data to sensor vectors provided by a sensor device. The corrective data may be retrieved from a look-up table in constant time, thereby resulting in corrected sensor vectors that approximate the performance of an ideal sensor (i.e., a sensor without significant error). Because the look-up table is accessed in constant-time, the table of corrective data, and thus the degree of accuracy correction, can be of arbitrarily high resolution without performance degradation.

According to one embodiment, a method of correcting a sensor vector provided by a sensor includes determining a largest magnitude vector component of a sensor vector having N dimensions, and determining a sign of the largest magnitude vector component. The method further includes selecting a major region of interest of a look-up table based on the largest magnitude vector component of the sensor vector and the sign of the largest magnitude vector component, wherein the look-up table includes 2*N major regions of interest, and each major region of interest has a plurality of cells. A cell of the plurality of cells that is nearest to the sensor vector is selected, and a final corrective data $c_v$ is applied to the sensor vector to obtain a corrected sensor vector, wherein the final corrective data $c_v$ is associated with the selected cell.

According to another embodiment, a method of creating a look-up table for use in correcting sensor vectors provided by a sensor includes establishing 2*N major regions of interest, where N is equal to a number of dimensions of a sensor vector provided by the sensor, dividing each major region of interest into a plurality of cells arranged in a plurality of rows and a plurality of columns, and gathering corrective data points. The corrective data points are gathered by, for each calibration orientation of the sensor of a plurality of sensor calibration orientations, determining a largest magnitude vector component of the sensor vector and a sign of the largest magnitude vector component, selecting a major region of interest of the look-up table associated with the largest magnitude vector component of the sensor vector and the sign of the largest magnitude vector component, selecting a cell of the plurality of cells that is nearest to the sensor vector, comparing the sensor vector with truth data associated with the calibration orientation, and calculating a corrective data point based at least in part on the comparison between the sensor vector and the truth data associated with the calibration orientation. The method further includes calculating stored corrective data for the plurality of cells based on one or more corrective data points associated with each cell.

According to yet another embodiment, a sensor device includes a sensor configured to provide a sensor vector having N dimensions, the sensor vector corresponding to an orientation of the sensor device, a controller operable to receive the sensor vector, and a computer useable medium storing computer readable code instructions and a look-up table including 2*N major regions of interest having a plurality of cells. The computer readable code instructions, when executed by the controller, cause the controller to determine a largest magnitude vector component of the sensor vector produced by the sensor, determine a sign of the largest magnitude vector component, select a major region of interest of the look-up table based on the largest magnitude vector component of the sensor vector and the sign of the largest magnitude vector component, select a cell of the plurality of cells that is nearest to the sensor vector, and apply final corrective data $c_v$ to the sensor vector to obtain a corrected sensor vector, wherein the final corrective data $c_v$ is associated with the selected cell.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Embodiments of the present disclosure are directed to sensor devices, such as, but not limited to, multi-axis magnetometers, multi-axis accelerometers, sonar arrays, and radar arrays, that produce corrected sensor vectors as output by accessing corrective data in a look-up table that is accessed in constant time. Accordingly, the output of the sensor device may be more reliable and accurate by the use of the corrective data.

Figure 2:
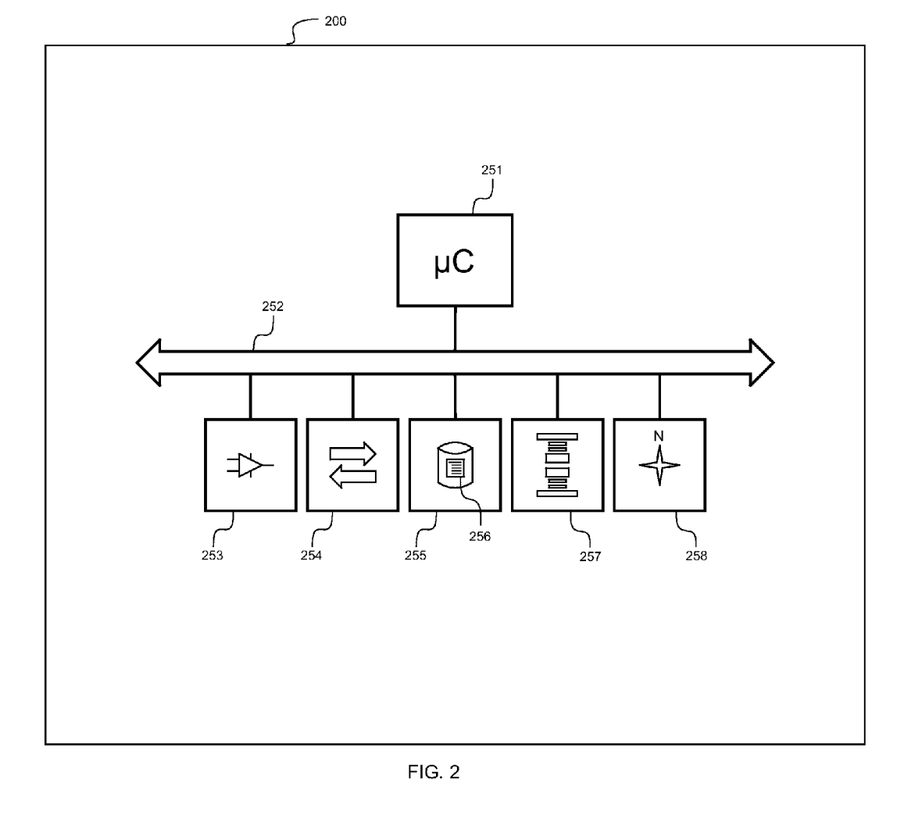
FIG. 2 schematically depicts components of a sensor device according to one or more embodiments described and illustrated herein.

Referring now to FIG. 2, internal components of an exemplary sensor device (e.g., the sensor device 101 depicted in FIGS. 1A and 1B) is schematically illustrated. More particularly, FIG. 2 depicts a sensor device 200 for estimating an orientation of the sensor device 200 (and/or the orientation of an object or device incorporating the sensor device 200) embodied as hardware, software, and/or firmware, according to embodiments shown and described herein. It is noted that computer-program products and methods for correcting the output of the sensor device 200 may be executed by any combination of hardware, software, and/or firmware.

The sensor device 200 illustrated in FIG. 2 comprises a controller 251, additional controller hardware 253, input/output hardware 254, a non-transitory computer useable medium 255 (which may store computer readable code 256 for performing the various operations for orientation estimations, for example), a first physical sensor 257, and a second physical sensor 258. In the illustrated embodiment, the first physical sensor 257 is an accelerometer and the second physical sensor 258 is a magnetometer or compass. More or fewer sensors may be utilized. For example, the sensor device 200 may include only one sensor. It should be understood that the components illustrated in FIG. 2 are merely exemplary and are not intended to limit the scope of this disclosure.

The computer useable medium 255 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the computer useable medium 255 may be configured to store, among other things, computer readable code 256, one or more look-up tables, and associated corrective data for correcting the sensor vector outputs for the one or more sensors 257, 258, as described in more detail below. It should be understood that the computer useable medium 255 may also store one additional data for access by the controller 251 and/or additional controller hardware 253. A local interface 252 is also included in the embodiment of FIG. 2, and may be implemented as a bus or other interface to facilitate communication among the components of the sensor device 200.

The controller 251 may include any processing component configured to receive and execute instructions (such as from the computer useable medium 255). It is noted that the correction methods described herein may be effectuated by the controller as software instructions stored on the computer useable medium 255, as well as by additional controller hardware 253. In some embodiments, the additional controller hardware 253 may comprise logic gates to perform the software instructions as a hardware implementation. The controller 251 may be configured as, but not limited to, a general purpose microcontroller, an application-specific integrated circuit, or a programmable logic controller.

The sensor device 200 may be incorporated into larger systems, and may be able to communicate with external devices and components of such systems via input/output hardware 254. The input/output hardware 254 may include any hardware and/or software for sending and receiving data, such as an output signal corresponding to an orientation estimation of the sensor device 200. Exemplary input/output hardware 254 includes, but is not limited to, universal serial bus (USB), FireWire, Thunderbolt, local area network (LAN) port, wireless fidelity (Wi-Fi) card, WiMax card, and/or other hardware for communicating with other networks and/or external devices.

As described in more detail below, the first and second physical sensors 257, 258 may be configured to provide a signal to the controller 251 (or other components of the sensor device 200) as a sensor vector that corresponds with a physical orientation of the sensor device 200. The signal or data from the first and/or second physical sensors 257, 258 may be provided to the controller 251 and/or additional controller hardware 253 over the local interface 252. For example, the accelerometer may be configured to provide a sensor vector that corresponds to its orientation relative to gravity, while the magnetometer may be configured to provide a sensor vector that corresponds to its orientation relative to magnetic North. The accelerometer and the magnetometer may be configured as any proprietary, currently available, or yet-to-be-developed sensor. It should be understood that the sensor device 200 may have any combination of accelerometers and magnetometers (or other sensors that output a sensor vector corresponding to orientation).

As described in detail below, embodiments of the present disclosure utilize a look-up table of corrective data that is used to adjust (correct) the sensor's output data. As an example and not a limitation, the corrective data may be in the form of a vector offset that is added to the sensor data (i.e., sensor vector). The corrective data may also be configured as a vector representing the true physical quantity (e.g., gravity or magnetic North) that may be compared to the sensor vector, or as other types of data.

The look-up table is used to store corrective data for one or more readings taken from the one or more sensors during calibration. The look-up table structure and corrective data may be generated during system setup or system calibration by creating the look-up table and populating the table nodes with corrective data that are stored within the table nodes. During system execution, sensor readings (i.e., sensor vectors) are used to index table nodes from which proper corrective data may be retrieved. Once retrieved, the corrective data is then applied to the sensor vector to produce a corrected sensor vector.

Embodiments of the present disclosure may allow for the correction of any type of error, including severe sensor distortion and severe sensor non-linearities while not requiring foreknowledge of the causes of the sensor errors. Additionally, the corrective data may be retrieved in constant time regardless of the size and resolution of the look-up table, thus potentially making the look-up table more efficient than methods based upon transformations. Various embodiments of the generation and use of the reference vector set are described in detail below.

Look-Up Table Structure

Figure 3:
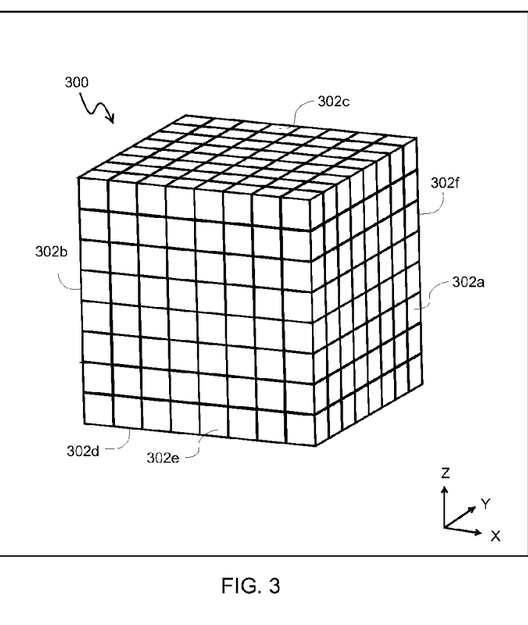
FIG. 3 schematically depicts a cube-shaped grid having six sides according to one or more embodiments described and illustrated herein.
Figure 4:
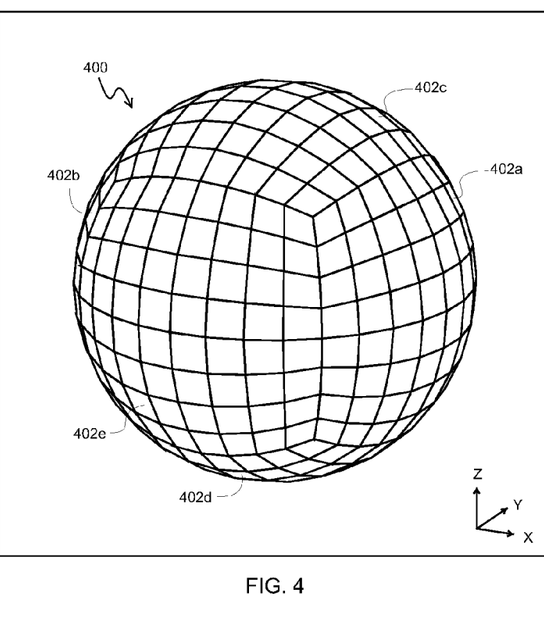
FIG. 4 schematically depicts a cubo-sphere look-up table according to one or more embodiments described and illustrated herein.

The look-up table may be configured as a three-dimensional table having 2*N sides, wherein N is equal to the number of dimensions of the sensor vector. It is noted that embodiments of the present disclosure assume that even with sensor error and distortion that may be present, the sensor vectors maintain a one to one relationship with sensor orientations. Additionally, embodiments may use normalized sensor vectors, thus ignoring the magnitude component of the sensor vector during the look-up and correction process. These assumptions imply that all data can be stored in an N-dimensional spherical look-up table. Referring to FIGS. 3 and 4, a look-up table 400 may be organized as a geometric cubo-sphere to allow constant-time value look-ups. More specifically, the exemplary look-up table 400 depicted in FIG. 4 is shaped like an N dimensional sphere, where N is the number of components in the vector data.

Embodiments include a process of indexing into a sphere-shaped look-up table using a vector. There are a number of ways to perform such an indexing function, though it may be preferable to configure the look-up process to have low computational overhead and have execution as close to constant time (i.e., not based on number of points in the sphere) as possible. To this end, the type of look-up table 400 of one embodiment is a cubo-sphere, which is cube-shaped look-up grid 300 projected onto a spherical data set, as illustrated in FIGS. 3 and 4. FIG. 3 depicts a cube-shaped grid 300 having six sides 302a-302f, wherein each side comprises a table defined by a plurality of cells that are arranged in a plurality of rows and a plurality of columns. The cube-shaped grid 300 has three pairs of opposing sides such that in each pair of opposing sides; one of the sides is associated with a positive sign of a vector component while the other side is associated with a negative sign of the vector component. For example, side 302a is positioned in a plane that is orthogonal with respect to the x-axis vector component in a positive direction, while side 302b, which opposes side 302a, is orthogonal with respect to the x-axis vector component in a negative direction.

Referring now to FIG. 4, the cube-shaped grid 300 is inscribed within a sphere and then projected from the center of the sphere onto a surface of the sphere, thereby defining a cubo-sphere look-up table 400 that is divided into 2*N equal-sized major regions 402a-402f. The major regions 402a-402f are defined by the projected sides 302a-302f of the cube-shaped grid 300. Each major region 402a-402f is thus defined by the largest vector component within that particular major region, with two such major regions for each component due to positive and negative major component values, as described above with respect to FIG. 3. Each major region is subsequently organized as a look-up table that uses the remaining minor vector components to index either a single corrective datum, or a set of corrective data if interpolative correction is used. Thus, a three dimensional sensor would yield six major regions 402a-402f, with each major region containing a two dimensional look-up table of cells where each cell contains corrective data. Any number of cells may be provided within the two dimensional look-up table 400 depending on the desired resolution.

Look-Up Table Indexing

Although the table structures and indexing schemes described herein will work for vectors of any dimensionality, the embodiments described wherein focus on the case in which N is equal to three for the sake of understandability, and because tri-axial sensors are commonly used. It is noted that the look-up table indexing schemes described within this section apply for both calibrating and setting up the sensor device to determine the corrective data within the one or more cells of the look-up table, as well as during execution of the sensor device for accessing the proper corrective data within the look-up table.

First, to properly index the look-up table 400, the major region through which the input vector extends may be determined. The input vector may be a sensor vector provided by one or more of the sensors within the sensor device (e.g., first and second sensors 257, 258 of sensor device 200 depicted in FIG. 2) during calibration or execution of the sensor device. The proper major region may be determined by evaluating which of the three vector components (e.g., x, y, and z) of the current sensor vector is largest in magnitude, and then checking the sign of that component. Thus, each of the six major regions 402a-402f of the look-up table 400 are uniquely identified by a major vector component and the sign of that vector component. For example, referring to FIG. 5A, a sensor vector 501 is provided by a sensor within the sensor device and is schematically depicted as extending from a look-up table 500 as described above with respect to FIG. 4. It is noted that only major region 502a is depicted as having cells for ease of illustration. The major vector component of the sensor vector 501 is along the x-axis, so the selected major region should be either major region 502a or major region 502*b*. The sign of the major vector component of the sensor vector 501 is positive, so therefore major region 502*a* is selected as the major region 502*a* of interest. Each major region 502*a*-502*f* contains or references a two dimensional look-up table of cells that is used for subsequent look-up processes. Sensor vector 501 falls within major region 502*a*, so the two dimensional look-up table (i.e., grid) belonging to major region 502*a* is selected.

Cell Selection

Figure 5A:
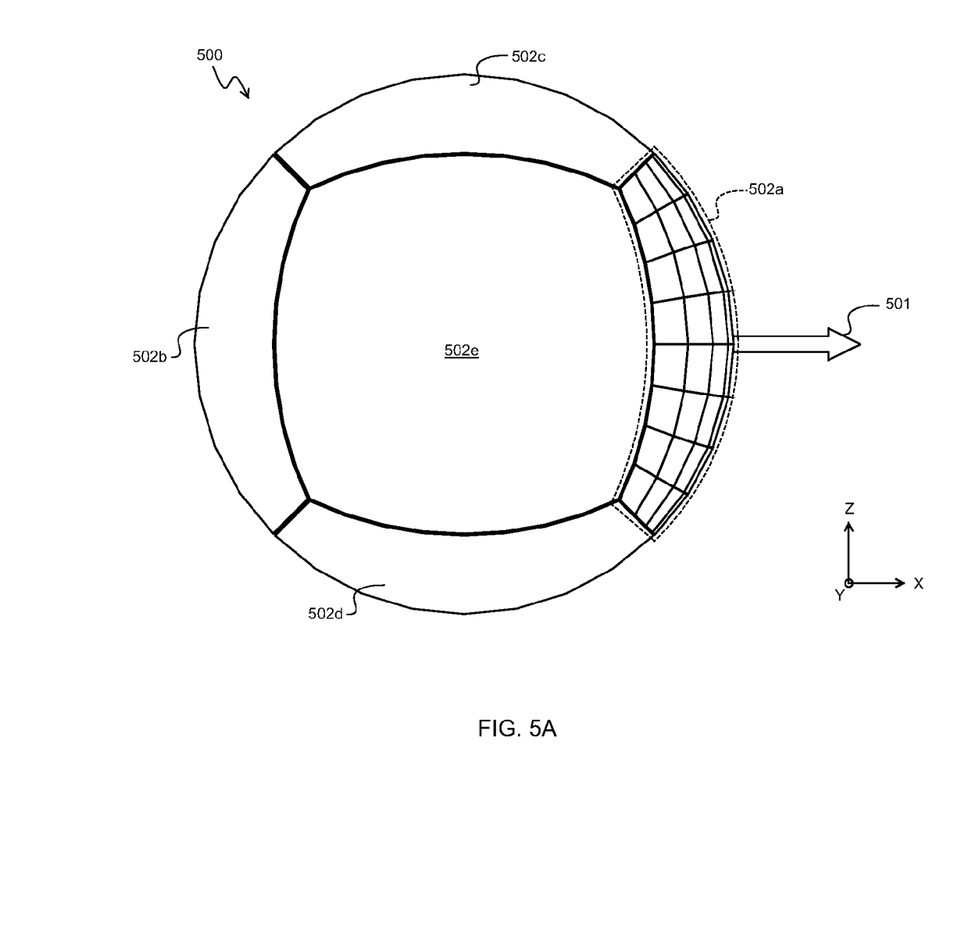
FIG. 5A schematically depicts a major region of a look-up table being selected using a sensor vector according to one or more embodiments described and illustrated herein.
Figure 5B:
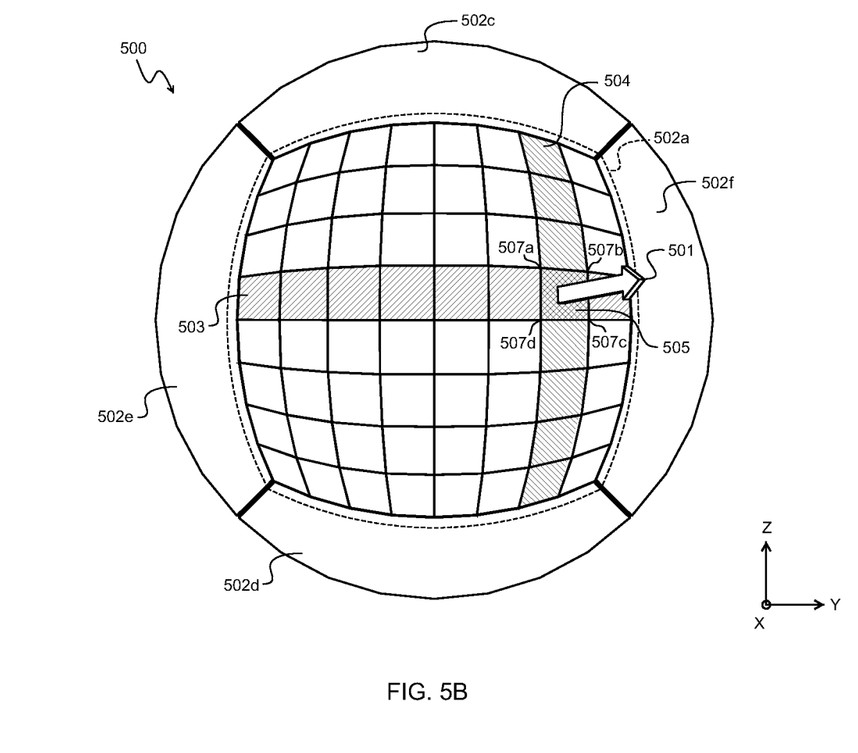
FIG. 5B schematically depicts a cell within a major region of a look-up table being selected using the sensor vector depicted in FIG. 5A according to one or more embodiments described and illustrated herein.

After the two dimensional table associated with the selected major region has been determined, a particular cell within the selected two dimensional table through which the sensed vector 501 extends is selected. FIG. 5B depicts the look-up table 500 of FIG. 5A but rotated clockwise about the z-axis to more fully depict the cells of major region 502*a*. In one embodiment, the particular cell is selected by calculating an angle for each of the non-primary dimensions/components of the two dimensional grid, wherein one non-primary dimension corresponding to a row within the two dimensional grid and the other corresponding to a column within the two dimensional grid. From the calculated row index and column index, a specific cell may be determined.

To determine the row index and column index, two angles may be calculated using the major vector component associated with the major region and each of the remaining minor components. As an example and not a limitation, in the illustrated embodiment, the x component is the largest, and therefore the two dimensional value that may be used to index into the grid will have a component based on x and y (row), and one based on x and z (column). The calculation for row and column indexing may be performed by the following:

$$LV_R = a\tan(vec[\text{minor\_vector\_component\_1}]/abs(vec[\text{major\_vector\_component}]))/(\pi/4), \quad \text{Eq. (1); and}$$

$$LV_C = a\tan(vec[\text{minor\_vector\_component\_2}]/abs(vec[\text{major\_vector\_component}]))/(\pi/4), \quad \text{Eq. (2),}$$

where:
$LV_R$ is a row look-up value;
$LV_C$ is a column look-up value;
minor_vector_component_1 is the first minor vector component;
minor_vector_component_2 is the second minor vector component; and
major_vector_component is the major vector component.

Equations (1) and (2) yield two values, each in the range −1 to 1, which may subsequently be used to determine the row and column indices of a cell within the selected two dimensional grid for the major region in question as follows:

$$\text{row\_selection} = int((LV_R+1)/2 * \text{number\_of\_rows}); \quad \text{Eq (3);}$$

$$\text{column\_selection} = int((LV_C+1)/2 * \text{number\_of\_columns}), \quad \text{Eq. (4),}$$

where:
number_of_rows is equal to the number of rows within the selected two dimensional grid; and
number_of_columns is equal to the number of columns within the selected two dimensional grid.

An example is illustrated in FIG. 5B. Sensor vector 501 is used within major region 502*a* to compute row_selection 503 and column_selection 504 which are used to determine table cell 405 that is associated with the sensor vector 501.

Indexing

After the proper cell has been selected, corrective data may be either generated or accessed, depending on whether the sensor device is being calibrated or executed within its indented system. In the case of execution, in one embodiment, the corrective data may be accessed by:

$$c_v = \text{major\_region\_corrective\_vector}[row][column], \quad \text{Eq. (5),}$$

where $c_v$ is the corrective data that is retrieved from the table, and major_region_corrective_vector[row][column] is the corrective data that is associated with the selected cell.

Additionally, more complex corrective data may be computed by interpolating multiple corrective data stored within each cell. This approach may be preferred because it may produce a smooth corrective response across adjacent cell regions while adding little computational overhead. The interpolation may be performed within the cell by using a two dimensional interpolation such as bilinear, bicubic, inverse distance weighting, or any other form of multivariate interpolation. As an example and not a limitation, each corner (or some corners) of each cell (or some cells) within the two dimensional grid of the selected major region may have corrective data associated therewith. Final corrective data $c_v$ may be determined by two dimensional interpolation, such that a weight for the corrective data at each corner is calculated based on a distance of the sensor vector from each corner. A weighted sum of the weights for the corrective data at each corner may be calculated to obtain the final corrective data $c_v$. Other calculation methods to calculate the final corrective data $c_v$ are also possible and include, but are not limited to, the two dimensional interpolation methods described below with respect to gathering and calculating the corrective data that is stored within the look-up table 400/500 during calibration and/or setup.

Lookup Table Data Collection

Referring to FIGS. 5A and 5B, the cells of the look-up table 500 should contain corrective data that, once applied to the sensor vector, produces a corrected sensor vector output. The corrective data may be created and populated into the look-up table 500 as part of a system setup procedure or system calibration procedure. The corrective data in the look-up table 500 can take the form of a single corrective datum per cell, multiple corrective data per cell for interpolative correction, or other forms of corrective data entirely. Thus, to set up the look-up table 500, each table cell may be initialized with gathered data collected from a trusted source that is trusted more than the sensor that is being corrected. This data may be gathered as a list wherein each list entry contains, for example, a sensor vector which was read from the sensor, and truth data obtained from the more trusted source. The read sensor vector and truth data (e.g., a truth vector of what the sensor vector should be) pairs are referred to herein as gathered data.

Each gathered data pair may then be used to calculate a corrective data point, which is a transformation of the sensor vector and the truth data, such as the offset between the sensor vector and the truth data. From the calculated corrective data points, the corrective data $c_v$ may be calculated and stored for the cells within the look-up table 500. There are a number of ways to gather the gathered data during calibration and/or setup.

In one embodiment, which requires no extra equipment, is to manually position the sensor device into known positions in which correct results are known, and to record the reading from the sensor device along with the expected reading, wherein the expected reading acts as the truth data. However, although this method is simple, it may be prone to error, difficult to gather large amounts of data, and difficult to automate.

Figure 6:
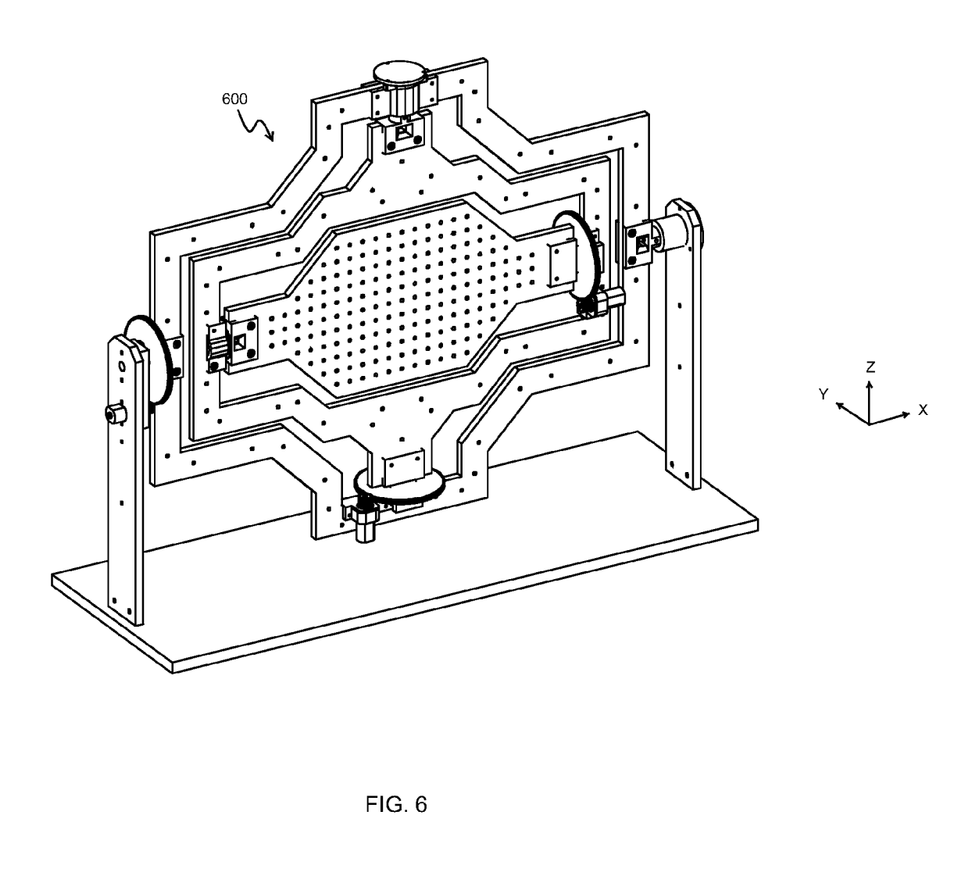
FIG. 6 depicts a gimbal device according to one or more embodiments described and illustrated herein.

Another method of data gathering for system setup and calibration may be with the use of a three-axis gimbal 600, such as the gimbal depicted in FIG. 6. A gimbal 600 may allow the sensor device to be placed onto any set of desired orientations, taking readings from the gimbal's position sensors (which may act as the truth data) and from the sensor device itself (i.e., the sensor vectors). The gimbal orientation data can then be used as truth data to generate corrective data points for each sampled sensor orientation. The gimbal 600 may be programmed to take one or multiple readings per cell of the look-up table. As described in detail below, multiple corrective data points may be used to calculate one or more stored corrective data entries per cell.

Another option is to attach the sensor device to be calibrated to a second sensor that has either already been calibrated or is more trusted due to other factors, and to use readings from the more trusted sensor as truth data, pairing them with readings from the less trusted sensor. The corrective data point may be calculated based on the sensor device readings and the readings from the second sensor. An additional option is to use a different kind of sensor to generate the truth data. One such example would be to use a low-drift multi-axis gyroscope, which can exhibit accurate orientation estimates over short-term durations. Thus, the orientation estimate generated by the gyroscope can be used as the reference by which the corrective data points are created. This could even be done while the system is running, allowing the system to continuously and dynamically adjust the corrective data within the table as the system is used. There are still other options for specific types of sensors under calibration. For example, when using a magnetometer, it is possible to use a Helmholtz coil to create a specific magnetic field in the region around the sensor device. The generated magnetic field's direction can be used.

Lookup Table Cell Initialization

The gathered data (e.g., the sensor vector and the truth data pairs) is subsequently used to initialize the cells in the correction table with corrective data. There are many ways to place this gathered data within the look-up table, but each case involves using the gathered data to generate and store one or more corrective data for each cell or cell corner of the correction table. Non-limiting examples of calculating the corrective data from the gathered data for the various cells of the look-up table are described below.

Simple Cell Averaging

In one embodiment, a single stored corrective data entry is calculated and stored in each cell by taking an average of all corrective data points calculated from gathered data with sensor vectors corresponding to that cell via the indexing process discussed previously.

Cell Corner Region Interpolation

Another method may be to use interpolation of corrective data points where the corners of each cell are used as the storage location for corrective data, and cells share corners. In this manner, a corrective data point calculated from a gathered data point which is located near a boundary between two cells will have an influence on both cells. Each cell may then store only a list of the four corners nearest to it, by which it may access the corrective data stored at these corners. Collection of corrective data points for each corner may be performed by the following:

1. Use an indexing method to find the cell which corresponds to a given sensor vector, such as the indexing method described above.
2. Determine the position of the sensor vector within the cell. For example, if the sensor vector points directly to the middle of the cell and the cell contains positions ranging from 0 to 1 on each axis, the cell position would be (0.5, 0.5).
3. Perform a two dimensional multi-variate interpolation using the cell position of the sensor vector to determine a weight corresponding to each corner of the cell.
4. Add the corrective data point calculated from the gathered data point associated with the sensor vector, along with its calculated weight, to each corner's weighted corrective data set.

Figure 7:
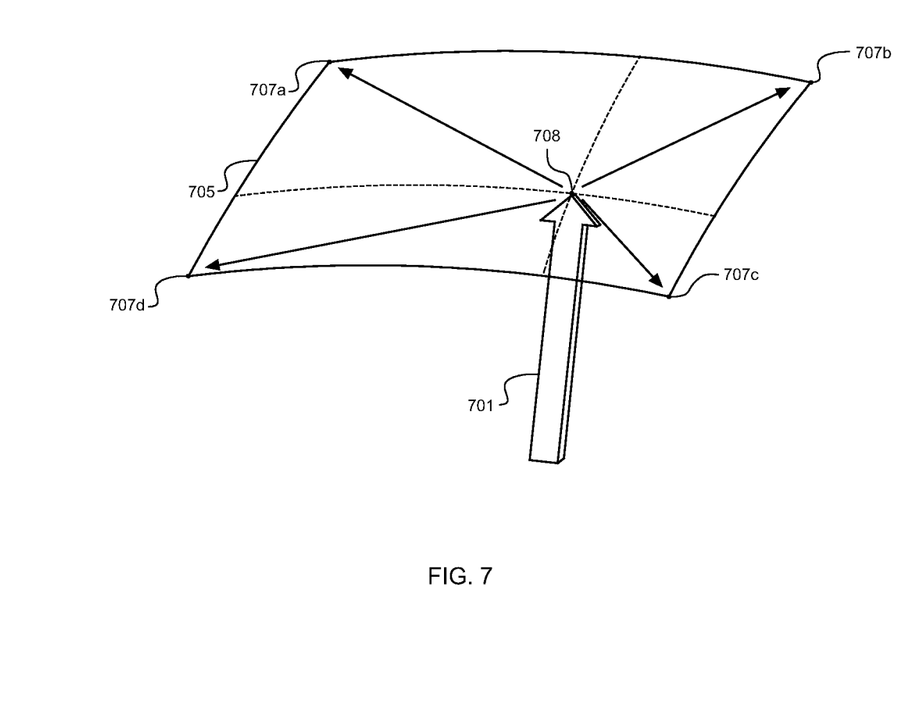
FIG. 7 schematically depicts a sensor vector impinging a region within a cell for calculating weights of corrective data at corners of the cell according to one or more embodiments described and illustrated herein.

An exemplary illustration of this process is shown in FIG. 7. Sensor vector 701 is indexed into cell 705, and then distributed to the four corners 707a, 707b, 707c, and 707d according to a weighted distribution process which is based on the distance from the point 708 where the sensor vector 701 falls on the cell 705, and each of the four corners 707a-707d. Using bilinear interpolation, assuming that the x coordinate of the cell position is x_cell and the y component is y_cell, the weight for a corner may be obtained by multiplying (1-x_cell)*(1-y_cell) for the lower left corner 707d, x_cell*(1-y_cell) for the lower right corner 707c, (1-x_cell)*y_cell for the upper left corner 707a, and x_cell*y_cell for the upper right corner 707b. In the example given in FIG. 6, imagine that 707d is at (0,0), 707b is at (1,1), and 708 is at (0.75, 0.25). The weights calculated for each corner using bilinear interpolation would be 0.1875 for 707d and 707b, 0.5625 for 707c, and 0.0625 for 707a.

Once this process has been completed for every gathered data pair that has been taken, a stored corrective data entry may be calculated for each corner using the weighted corrective data points. In one embodiment, the stored corrective data entry for each corner is calculated by summing all of the weights associated with the corrective data points at the particular corner (call this sum $s_w$). Each weight may then be normalized by dividing each weight by $s_w$. The stored corrective data entry for the particular corner may be calculated by performing a weighted sum of all corrective data points associated with the particular corner. More particularly, each normalized weight is multiplied by its corresponding corrective data point, and the weighted corrective data points are added to obtain the stored corrective data for the particular corner. The gathered data may be stored in the look-up table or discarded after calculation of the stored corrective data entries for the various corners of the look-up table. The corrective data for each cell comprises the corrective data entry for each corner of the cell. Other methods may also be utilized to calculate the stored corrective data.

Cell Corner Nearest-N Neighbor Interpolation

Another method to initialize cells uses a nearest-N neighbor interpolation scheme to initialize the corrective data in each cell. It is noted that the nearest-N neighbor interpolation is also referred to herein as the nearest-M interpolation scheme to distinguish the number of dimensions N of the sensor device from this interpolation scheme. This method may apply inverse distance weighting to a set of M corrective data points of gathered data pairs nearest to the corner for which to generate the stored corrective data. These inverse-distance weighted corrective data points are then summed using their gathered weights to generate the stored corrective data entry stored at the corner within the table. In this manner, corrective data entries may be generated for each cell regardless of the number of gathered data pairs within the gathered data list. An example of this scheme is provided below, where for each cell:

1. Establish a comparison vector (not shown) that points directly out of the look-up table at the center of the cell of interest.
2. Compare the comparison vector to each sensor vector in the gathered data, using a vector nearness calculation such as a dot product or the distance formula applied to the difference between the vectors.
3. Perform a weighted sum (weighted using the vector nearness metric given in (2), and using normalized weights as in the cell corner region interpolation method) of the corrective data points calculated from the nearest M of the gathered data based on the sensor vector, and store the result as a corrective data at this cell.

This method will also work if applied to each cell corner instead of each cell. For example, a comparison vector may be established as each corner rather than the center of the cell.

Region of Influence Interpolation

Another way to initialize cells is collect all gathered data within a region of interest localized around each cell corner (or center of the cell or other location). Inverse distance weighting may then be applied to each of the corrective points associated with the gathered data collected within the region of interest. These inverse-distance weighted corrective data points may then be summed using their weights to generate the stored corrective data entry that is stored at the node (e.g., cell corner, center of cell, or other location) within the look-up table. In this manner, only gathered data near each cell influence the stored corrective data entry that is stored at that cell. Additionally, the region of influence may be adjusted to allow either overlapping or isolated influence regions. An example of this scheme is provided below, where for each cell:

1. Establish a comparison vector (not shown) that points directly out of the look-up table at the center of the cell of interest.
2. Compare the comparison vector to each sensor vector in the gathered data, using a vector nearness calculation such as a dot product or the distance formula applied to the difference between the vectors.
3. For all corrective data points of the gathered data that fall within the region of influence, perform a weighted sum (weighted using the vector nearness metric given in (2), and using normalized weights as in the cell corner region interpolation method) of these corrective data points and store the result as a stored corrective data entry at this cell.

This method will also work if applied to each cell corner instead of each cell. For example, a comparison vector may be established at each cell corner rather than the center of each cell.

Data Look-Up

Figure 8:
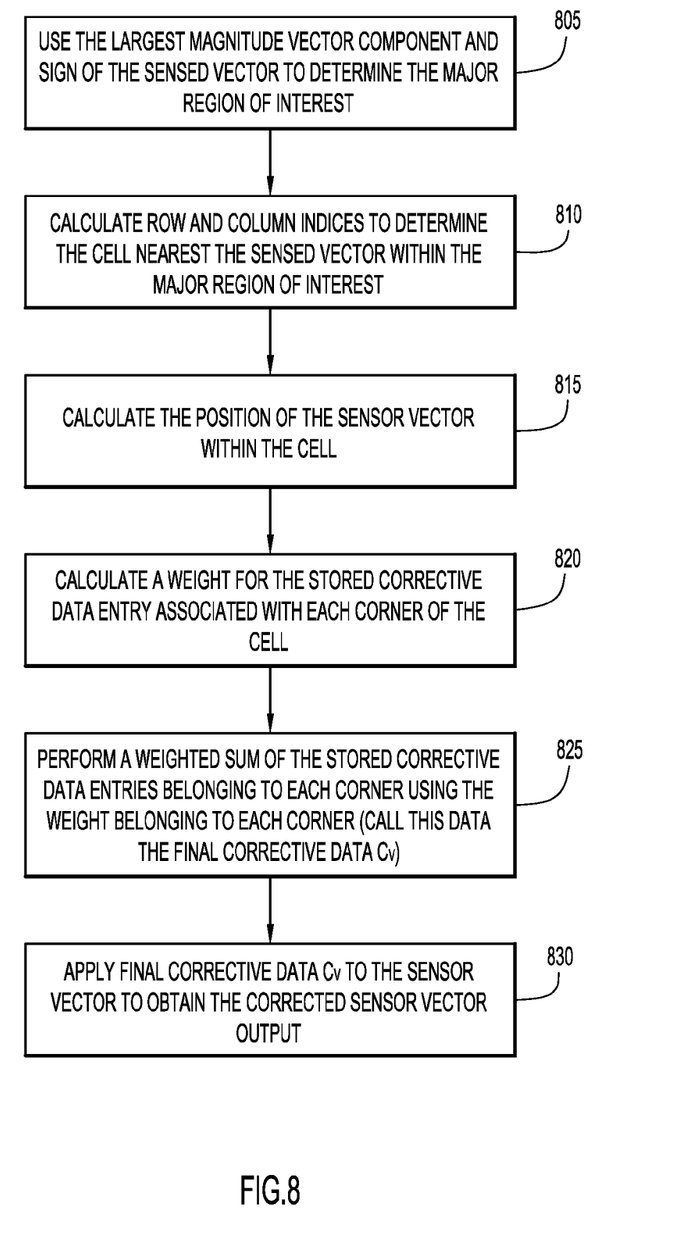
FIG. 8 depicts a flow diagram for determining the final corrective data according to one or more embodiments described and illustrated herein.

After the look-up table has been initialized and populated with corrective data, it is now ready for use with the sensor in normal operation. The one or more sensors of the sensor device may produce a sensor vector that is then corrected by final corrective data $c_v$ to yield a corrected sensor vector output. In one embodiment, the final corrective data $c_v$ is simply the stored corrective data entry associated with the cell that is closest to the sensed vector. In other embodiments, multiple stored corrective data entries are used to calculate the final corrective data $c_v$, such as stored corrected data entries that are stored at the corners of each cell. Similar to the table initialization methods described above, multi-variate interpolation of the stored corrective data entries at the corners of cells may be used to calculate the final corrective data $c_v$. Referring to FIG. 8, in one embodiment, the final corrective data $c_v$ is determined by the following:

1. Use the largest magnitude vector component and sign of the sensed vector to determine the major region of interest (at 805) as described above.
2. Calculate row and column indices to determine the cell nearest the sensed vector within the major region of interest (at 810) as described above.
3. Calculate the position of the sensor vector within the cell (at 815) as described above.
4. Calculate a weight for the stored corrective data entry associated with each corner of the cell (at 820) (e.g., by a two dimensional multi-variate interpolation methodology, such as those described above).
5. Perform a weighted sum of the stored corrective data entries belonging to each corner using the weight belonging to each corner (at 825), call this data the final corrective data $c_v$.
6. Apply final corrective data c to the sensor vector to obtain the corrected sensor vector output (at 830). In the case where the corrective data is a vector offset, this would involve adding the vector offset to the sensor vector.

In this manner, embodiments may be utilized to correct sensor output in real time. Additionally, in an interpolative scheme, it is possible to store only the corner vertices thus avoiding storage requirements of the grid cells entirely. This can be done by using the cell index to directly calculate the indices of all corners which would be near that cell. Other possible enhancements could include: storing corrective data for magnitude in addition to direction, storing corrective data for multiple sensors within one look-up table, using interpolation schemes that utilize corrective data stored at points other than the cell corners to improve interpolation accuracy, storing the corrective data in the table in a manner that utilizes a form of compression thus reducing storage requirements, and representing the major regions and/or cell corrective data as a multi-variate function thus reducing storage requirements. Embodiments may also be extended to application to sensor data sets that are not one-to-one by storing magnitude information or alternate sensor data at each table node. This additional data could then be used to determine which corrective data is applied in regions of the table where overlapping corrective data is stored.

It is to be understood that the preceding detailed description is intended to provide an overview or framework for understanding the nature and character of the subject matter as it is claimed. It will be apparent to those skilled in the art that various modifications and variations can be made to the embodiments described herein without departing from the spirit and scope of the present disclosure. Thus, it is intended that the claimed subject matter cover the modifications and variations of this disclosure provided they come within the scope of the appended claims and their equivalents.

It is noted that terms like "commonly," when utilized herein, are not intended to limit the scope of the claimed subject matter or to imply that certain features are critical, essential, or even important to the structure or function of the claimed subject matter. Rather, these terms are merely intended to highlight alternative or additional features that may or may not be utilized in a particular embodiment.

What is claimed is:

1. A method of producing a sensor measurement by a sensor device comprising a multi-axis magnetometer providing an orientation measurement, the multi-axis magnetometer including a controller and a physical sensor implemented by a magnetometer, the method comprising:

generating a sensor vector by the physical sensor of the multi-axis magnetometer of the sensor device, wherein the sensor vector corresponds with a measurement performed by the magnetometer implementing the physical sensor of orientation of the magnetometer implementing the physical sensor relative to a magnetic North;

determining a vector component of the sensor vector with a largest magnitude via the controller of the multi-axis magnetometer, and determining a sign of the largest magnitude vector component, wherein the sensor vector includes N dimensions;

selecting a major region of interest of a look-up table, via the controller of the multi-axis magnetometer, based on the largest magnitude vector component of the sensor vector and the sign of the largest magnitude vector component, wherein the look-up table comprises 2*N major regions of interest each associated with a vector component of the sensor vector and the sign of a magnitude of the associated vector component, and each major region of interest comprises a plurality of cells each associated with corresponding corrective data for the sensor vector;

selecting a cell of the plurality of cells within the selected major region of interest that is nearest to the sensor vector via the controller of the multi-axis magnetometer;

applying final corrective data $c_v$ to the sensor vector, via the controller of the multi-axis magnetometer, to obtain a corrected sensor vector that accounts for errors in the sensor vector produced by the magnetometer implementing the physical sensor, wherein the final corrective data $c_v$ is associated with the selected cell and based on prior readings taken from the magnetometer implementing the physical sensor; and producing, via the controller of the multi-axis magnetometer, the corrected sensor vector as the orientation measurement from the multi-axis magnetometer of the sensor device to serve as a sensor device measurement.

2. The method of claim 1, wherein the final corrective data $c_v$ comprises a vector offset between a sensor vector and a truth vector representing a desired sensor vector value.

3. The method of claim 2, wherein the corrected sensor vector is obtained by adding the vector offset to the sensor vector.

4. The method of claim 1, wherein N=3 and the look-up table has six major regions of interest.

5. The method of claim 1, wherein the selected cell is selected by calculating a row look-up value and a column look-up value, wherein:

the row look-up value is based on an angle between a major vector component of the sensor vector determined by the largest magnitude vector component and a first minor vector component of the sensor vector;

the column look-up value is based on an angle between the major vector component of the sensor vector and a second minor vector component; and the row look-up value and the column look-up value point to the selected cell nearest to the sensor vector.

6. The method of claim 5, wherein:

the row look-up value is determined by:

$$a\tan(vec[\text{minor\_vector\_component\_1}]/abs(vec[\text{major\_vector\_component}]))/(\pi/4);$$

and the column look-up value is determined by:

$$a\tan(vec[\text{minor\_vector\_component\_2}]/abs(vec[\text{major\_vector\_component}]))/(\pi/4),$$

where:

minor_vector_component_1 is the first minor vector component;

minor_vector_component_2 is the second minor vector component; and major_vector_component is the major vector component.

7. The method of claim 6, wherein the selected cell is further selected by calculating a row and a column of the selected major region of interest by:

$$\text{row}=int((\text{row\_look-up\_value}+1)/2*\text{number\_of rows});$$

and $$\text{column}=int((\text{column look-up value}+1)/2*\text{number of columns}),$$

where:

number_of rows is equal to a number of rows within the selected major region of interest; and number_of columns is equal to a number of columns within the selected major region of interest.

8. The method of claim 1, further comprising, prior to applying the final corrective data $c_v$ to the sensor vector, calculating a position of the sensor vector within the selected cell.

9. The method of claim 8, wherein each corner of each cell within the plurality of cells stores corrective data, and the method further comprises:

calculating a weight for the corrective data at each corner based at least in part on a distance of the sensor vector from each respective corner; and calculating the final corrective data $c_v$ by taking a weighted sum of the weights for the corrective data at each corner.

10. The method of claim 9, wherein the corrective data is generated by a calibration process.

11. The method of claim 1, wherein the corrective data is generated by a calibration process comprising:

adjusting a calibration orientation of the sensor device and producing a calibration sensor vector representing a sensor device measurement at each of a plurality of calibration orientations;

for each calibration orientation of the sensor device of the plurality of calibration orientations:

determining a vector component of the calibration sensor vector with a largest magnitude and a sign of the largest magnitude vector component;

selecting a major region of interest of the look-up table associated with the largest magnitude vector component of the calibration sensor vector and the sign of the largest magnitude vector component of the calibration sensor vector, wherein each major region of interest is associated with a vector component of the calibration sensor vector and the sign of a magnitude of the associated vector component of the calibration sensor vector;

selecting a cell of the plurality of cells within the selected major region of interest that is nearest to the calibration sensor vector;

comparing the calibration sensor vector with truth data associated with the calibration orientation; and calculating a corrective data point based at least in part on the comparison between the calibration sensor vector and the truth data associated with the calibration orientation;

calculating corrective data for the plurality of cells based on one or more corrective data points associated with each cell; and storing the corrective data in corresponding ones of the plurality of cells of the look-up table of the sensor device.

12. The method of claim 11, wherein the look-up table is a cubo-sphere.

13. The method of claim 12, wherein the sensor device is positioned in the plurality of calibration orientations by use of a gimbal.

14. The method of claim 13, wherein the truth data associated with the calibration orientation is determined from gimbal orientation data generated by the gimbal.

15. The method of claim 11, wherein the truth data associated with the calibration orientation is generated by a second sensor.

16. The method of claim 11, wherein multiple corrective data points for each cell are calculated.

17. The method of claim 11, wherein each cell comprises a stored corrective data entry calculated by averaging the corrective data points associated with the cell, the corrective data entries defining the stored corrective data for the plurality of cells.

18. The method of claim 11, wherein each cell corner comprises a stored corrective data entry, the stored corrective data entries defining the stored corrective data for the plurality of cells, and each stored corrective data entry is calculated by:

for each calibration sensor vector:
selecting a cell of the plurality of cells that is nearest to the calibration sensor vector;
determining a position of the calibration sensor vector within the selected cell;
calculating a weight corresponding to each corner of the selected cell based on the position of the calibration sensor vector within the selected cell;
for each corner of the selected cell, adding the calculated weight and the corrective data point of the calibration sensor vector to a data set of the corner;

for each corner of the look-up table:
adding all of the weights of the data set associated with the corner to calculate a summed weight $s_w$;
dividing each weight within the data set by the summed weight $s_w$ to calculate a normalized weight for each corrective data point associated with the corner;
multiplying each normalized weight by its associated corrective data point to calculate a plurality of weighted corrective data points; and
summing the plurality of weighted corrective data points to calculate the stored corrective data entry for the corner.

19. The method of claim 11, wherein each cell comprises a stored corrective data entry, the stored corrective data entries defining the stored corrective data for the plurality of cells, and each stored corrective data entry is calculated by, for each cell:

calculating a weight for selected calibration sensor vectors of a plurality of calibration sensor vectors based on a distance of each selected calibration sensor vector from a comparison vector that points directly of a center of the cell;
calculating normalized weights for a nearest M selected calibration sensor vectors to the comparison vector; and
summing the normalized weights for the nearest M selected calibrated sensor vectors to calculate the stored corrective data entry for the cell.

20. The method of claim 11, wherein each corner comprises a stored corrective data entry, the stored corrective data entries defining the stored corrective data for the plurality of cells, and each stored corrective data entry is calculated by, for each corner:

calculating a weight for selected calibration sensor vectors of a plurality of calibration sensor vectors based on a distance of each selected calibration sensor vector from a comparison vector that points directly out of the corner;
calculating normalized weights for the weights of a nearest M selected calibration sensor vectors to the comparison vector; and
summing the normalized weights for the nearest M selected calibration sensor vectors to calculate the stored corrective data entry for the corner.

21. The method of claim 11, wherein each cell and/or each corner comprises a stored corrective data entry, the stored corrective data entries defining the stored corrected data for the plurality of cells, and each stored corrective data entry is calculated by, for each cell and/or each corner:

establishing a comparison vector that points directly out of center of the cell or corner;
defining a region of interest about the comparison vector;
calculating weights for selected calibration sensor vectors within the region of interest based on a distance of each selected calibration sensor vector from the comparison vector;
calculating normalized weights for the weights of the selected calibration sensor vectors within the region of interest; and
summing the normalized weights for the selected calibration sensor vectors within the region of interest to calculate the stored corrective data entry for the cell or the corner.

22. A sensor device comprising:

a multi-axis magnetometer producing an orientation measurement and comprising:
a sensor implemented by a magnetometer and configured to perform a measurement and provide a sensor vector having N dimensions, the sensor vector corresponding to an orientation of the magnetometer implementing the sensor relative to a magnetic North;
a controller operable to receive the sensor vector; and
a computer useable medium storing a look-up table comprising 2*N major regions of interest comprising a plurality of cells with each cell associated with corresponding corrective data for the sensor vector, and computer readable code instructions that, when executed by the controller, cause the controller to:
determine a vector component of the sensor vector produced by the sensor with a largest magnitude, and to determine a sign of the largest magnitude vector component;
select a major region of interest of the look-up table based on the largest magnitude vector component of the sensor vector and the sign of the largest magnitude vector component, wherein each major region of interest is associated with a component of the sensor vector and the sign of the magnitude of the associated vector component;
select a cell of the plurality of cells within the selected major region of interest that is nearest to the sensor vector;
apply final corrective data $c_v$ to the sensor vector to obtain a corrected sensor vector that accounts for errors in the sensor vector produced by the magnetometer implementing the sensor, wherein the final corrective data $c_v$ is associated with the selected cell and based on prior readings taken from the magnetometer implementing the sensor; and produce the corrected sensor vector as the orientation measurement from the multi-axis magnetometer of the sensor device to serve as a sensor device measurement.

23. The sensor device of claim 22, wherein the computer readable code instructions further cause the controller to calculate a position of the sensor vector within the selected cell.

24. The sensor device of claim 23, wherein each corner of each cell within the plurality of cells comprises corrective data, and the computer readable code instructions further cause the controller to:

calculate a weight for the corrective data at each corner based at least in part on a distance of the sensor vector from each respective corner; and calculate the final corrective data $c_v$ by taking a weighted sum of the weights for the corrective data at each corner.

* * * * *